(12) United States Patent
Jiang et al.

(10) Patent No.: US 10,047,708 B2
(45) Date of Patent: Aug. 14, 2018

(54) FUEL WATER SEPARATOR FILTER (71) Applicant: Cummins Filtration IP, Inc., Columbus, IN (US)

(72) Inventors: Zemin Jiang, Cookeville, TN (US); Ted Loftis, Cookeville, TN (US); Mark Johnson, Cookeville, TN (US)

(73) Assignee: Cummins Filtration IP, Inc., Columbus, IN (US)

(*) Notice: Subject to any disclaimer, the term of this patent is extended or adjusted under 35 U.S.C. 154(b) by 95 days.

(21) Appl. No.: 15/022,090

(22) PCT Filed: Sep. 19, 2014

(86) PCT No.: PCT/US2014/056465
§ 371 (c)(1),
(2) Date: Mar. 15, 2016

(87) PCT Pub. No.: WO2015/042348
PCT Pub. Date: Mar. 26, 2015

(65) Prior Publication Data
US 2016/0222931 A1 Aug. 4, 2016

Related U.S. Application Data (60) Provisional application No. 61/880,013, filed on Sep. 19, 2013.

(51) Int. Cl.
*F02M 37/22* (2006.01)
*B01D 29/58* (2006.01)
(Continued)

(52) U.S. Cl.
CPC ........... *F02M 37/221* (2013.01); *B01D 29/21* (2013.01); *B01D 29/58* (2013.01); *B01D 35/005* (2013.01);
(Continued)

(58) Field of Classification Search
CPC .... F02M 37/221; B01D 35/005; B01D 29/58; B01D 35/153; B01D 29/21; B01D 36/003; B01D 2201/0415; B01D 2201/316
(Continued)

(56) References Cited

U.S. PATENT DOCUMENTS 4,372,847 A * 2/1983 Lewis ............... B01D 17/00
123/510
5,855,772 A 1/1999 Miller et al.
(Continued)

FOREIGN PATENT DOCUMENTS

CN 102781540 A 11/2012

OTHER PUBLICATIONS

First Office Action issued for Chinese Patent Application No. 201480048082.5, with English language translation, dated Sep. 26, 2016, 13 pages.
(Continued)

*Primary Examiner* — Madeline Gonzalez
(74) *Attorney, Agent, or Firm* — Foley & Lardner LLP (57) ABSTRACT

A fuel water separator filter is described that is configured as a filter-in-filter construction with multiple water separating layers to separate water from the fuel. The fuel water separator filter is configured for use on a suction side of a fuel pump, and includes a neck with a radially outward facing seal that in use seals with the filter housing. The filter housing is formed with an isolated water sump that in use is isolated from water that is stripped from the fuel by the first stage of the outer filter. The isolated water sump is formed by a wall within the housing, instead of relying on an outer diameter seal on the filter to form the water sump.

20 Claims, 5 Drawing Sheets

(51) Int. Cl.
*B01D 35/00* (2006.01)
*B01D 29/21* (2006.01)
*B01D 35/153* (2006.01)
*B01D 36/00* (2006.01)

(52) U.S. Cl.
CPC ......... *B01D 35/153* (2013.01); *B01D 36/003* (2013.01); *B01D 2201/0415* (2013.01); *B01D 2201/316* (2013.01)

(58) Field of Classification Search
USPC ........ 210/337, DIG. 5, 338, 342, 458, 493.2
See application file for complete search history.

(56) References Cited

U.S. PATENT DOCUMENTS

| | | | |
|---|---|---|---|
| 7,857,974 B2* | 12/2010 | Jiang | B01D 29/21 210/232 |
| 7,935,255 B2 | 5/2011 | Jiang | |
| 8,043,504 B2* | 10/2011 | Malgorn | B01D 29/21 210/256 |
| 8,440,083 B2 | 5/2013 | Jiang et al. | |
| 2007/0289915 A1 | 12/2007 | Jiang et al. | |
| 2012/0318728 A1* | 12/2012 | Eberle | B01D 35/153 210/433.1 |
| 2013/0153487 A1 | 6/2013 | Terry et al. | |

OTHER PUBLICATIONS

International Search Report and Written Opinion for PCT/US2014/056465, dated Jan. 27, 2015, 10 pages.

\* cited by examiner

FUEL WATER SEPARATOR FILTER

CROSS-REFERENCE TO RELATED APPLICATIONS

This application is a U.S. national stage application claiming the benefit of International Application No. PCT/US2014/056465, filed on Sep. 19, 2014, which claims priority to and the benefit of U.S. Provisional Patent Application 61/880,013, filed Sep. 19, 2013. The entire contents of these applications are incorporated herein by reference in their entirety.

FIELD

Embodiments of this disclosure relate generally to a fuel water separator filter.

BACKGROUND

Fuel water separator filters that filter fuel, for example diesel fuel, and that also separate water from the fuel before the fuel is passed to the engine are known. Fuel water separator filter constructions are described in, for example, U.S. Pat. Nos. 7,857,974 and 7,935,255. Conventional fuel water separator filters are generally disposed on the high pressure, downstream, side of a fuel pump. Conventional fuel water separator filters typically employ an outer diameter seal that seals with an interior surface of a filter housing. Additionally, in conventional fuel water separator filter designs, an outer diameter of a bottom endplate of the filter typically seals with the interior of the filter housing to form a water sump.

SUMMARY

Embodiments of this disclosure relate generally to a fuel water separator filter system. More specifically, the embodiments relate to a fuel water separator filter that is configured as a filter-in-filter construction with multiple water separating layers to separate water from the fuel.

In one embodiment, the fuel water separator filter is configured for use on a suction, low pressure, side of a fuel pump, as opposed to being disposed on the high pressure, downstream, side. In some alternative embodiments, the described fuel water separator filter may be disposed on the high pressure side of a fuel pump.

In one embodiment, a suction side fuel water separator filter includes an outer filter and an inner filter disposed within and spaced from the outer filter. The outer filter can include a pleated filter media layer and a coalescing layer on an inner surface of the pleated filter media layer. A bottom endplate of the outer filter includes a neck with a radially outward facing seal configured to seal with a filter housing. The inner filter includes at least one of a pleated filter or a hydrophobic screen filter for additional water separation, a structure that attaches the inner filter to the outer filter, and a protrusion that engages with a valve structure on a standpipe of the housing.

In another embodiment, a filter housing that houses the fuel water separator filter is formed with an isolated water sump is configured to be isolated from water that is stripped from the fuel by a pleated filter media layer of an outer filter. The isolated water sump is formed in the filter housing separate from the filter, i.e. the filter does not form the isolated water sump.

A wall provided in the filter housing may separate the housing into a water sump and a filter chamber. The wall isolates the water sump from fuel entering the housing through the fuel inlet, thus improving fuel water separation performance. The fuel water separator filter seals with the wall forming the isolated water sump. Water that is stripped by the fuel water separator filter sinks to the outside of the filter (in the case of water stripped by the first stage water separating layer) which may then flow into the water sump through drain holes in the wall when the filter is removed during servicing, or may flow into the water sump through the drain holes in the case of water stripped by second, third or later water separating layers. The isolated water sump may be formed by a wall that is integrally formed with the filter housing.

In one embodiment, an isolated water sump can be formed by an insert plate that is installed into an existing filter housing to create the isolated water sump. The outer diameter of the insert plate is provided with a seal that seals with the interior of the filter housing. The inner diameter of the insert plate is configured to seal with a fuel outlet of the filter housing. Alternatively, the isolated water sump may be formed by any other appropriate process or structure.

In another embodiment, a valved standpipe structure can be installed in the fuel outlet of the filter housing together with the insert plate configured to create an isolated water sump. The valved standpipe structure can help secure the insert plate in position in the filter housing and help seal the inner diameter of the insert plate with the fuel outlet. The valved standpipe structure also forms a modified fuel outlet for the filter housing with a valve in the standpipe structure serving to control the flow of fuel through the standpipe structure and through the modified fuel outlet.

In one set of embodiments, a fuel water separator filter is provided that comprises an outer filter with a bottom endplate and an inner filter at least partially disposed within and secured to the outer filter. The outer filter and the inner filter combined provide a plurality of water separating layers. The inner filter includes a first sealing gasket, and the outer filter includes a second sealing gasket that is disposed on a first neck of the outer filter. The first neck is connected to the bottom endplate and is disposed radially inward of an outer diameter of the bottom endplate. There may be no sealing gasket on the outer diameter of the bottom endplate. The outer filter may include a filtration media and a separate coalescing layer. The inner filter may comprise a hydrophobic screen. The fuel water separator filter may be configured for use with a filter housing comprising a water sump that is isolated from a filter chamber of the housing. The inner filter may be secured to the outer filter by a snap-fit connection. The outer filter may further comprise a top endplate. The outer filter may further comprise a centertube. The outer filter may further comprise a second neck that extends into a central cavity of the outer filter, and the second neck may form a ledge configured to support the inner filter. The inner filter may comprise a support frame that includes a protrusion configured to activate a valve in a standpipe structure of a filter housing.

In another set of embodiments, a filter housing is provided that includes a housing with a fuel inlet and a fuel outlet. The housing is configured to house a fuel water separator filter. A wall is provided in the housing that separates the housing into a water sump and a filter chamber, and the water sump is isolated by the wall from fuel entering the housing through the fuel inlet. The wall may be integrally formed with the filter housing. Alternatively, the wall may be formed by a an insert plate configured to seal against an interior surface of the filter housing. The wall may include a center opening. The wall may include at least one opening configured to allow water to flow through the plate and into the water sump. A standpipe structure may be attached to the housing, and the standpipe structure may be configured to fluidly communicate with the fuel outlet. The standpipe structure may include a valve configured to be actuated by a protrusion of a fuel water separator filter.

In still another set of embodiments, a fuel water separator filter assembly for separating water from fuel is provided that comprises a filter housing having a fuel inlet and a fuel outlet and a fuel water separator filter disposed within the filter housing. The fuel outlet is configured to be fluidly connected to a suction side of a fuel pump, and the fuel water separator filter includes a plurality of water separating layers. The filter housing may comprise a housing with a fuel inlet and a fuel outlet, wherein the housing is configured to house a fuel water separator filter; and a wall may be provided in the housing that separates the housing into a water sump and a filter chamber. The water sump may be isolated by the wall from fuel entering the housing through the fuel inlet. The wall may be configured such that water that is separated from the fuel at an outer layer of the fuel water separator filter sinks to a base of the filter chamber. The wall may be configured such that water that is separated from the fuel at an inner layer of the fuel water separator filter passes through at least one opening in the wall and flows to the water sump. The fuel water separator filter may comprise an outer filter with a bottom endplate and an inner filter at least partially disposed within and secured to the outer filter. The outer filter and the inner filter combined may provide a plurality of water separating layers. The inner filter may include a first sealing gasket. The outer filter may include a second sealing gasket that is disposed on a neck of the outer filter, wherein the neck may be connected to the bottom endplate and is disposed radially inward of an outer diameter of the bottom endplate.

BRIEF DESCRIPTION OF THE DRAWINGS

References are made to the accompanying drawings that form a part of this disclosure, and which illustrate the embodiments in which the systems and methods described in this Specification can be practiced.

Like reference numbers represent like parts throughout.

DETAILED DESCRIPTION

Embodiments of this disclosure relate generally to a fuel water separator filter system. More specifically, the embodiments relate to a fuel water separator filter that is configured as a filter-in-filter construction with multiple water separating layers to separate water from the fuel.

In one embodiment, the fuel water separator filter is configured for use on a suction, low pressure, side of a fuel pump, as opposed to being disposed on the high pressure side. In some embodiments, the described fuel water separator filter may be disposed on the high pressure side of a fuel pump.

The fuel water separator filter is configured to be housed in a filter housing that is formed with an isolated water sump is configured to be isolated from water that is stripped from the fuel by the first stage of the water separating layers. The isolated water sump is formed in the filter housing separate from the filter, i.e. the filter does not contribute to forming the isolated water sump and the incoming fuel is separated from the water sump. The filter housing can be pre-formed with the isolated water sump, or an existing filter housing can be modified to create the isolated water sump.

Figure 1:
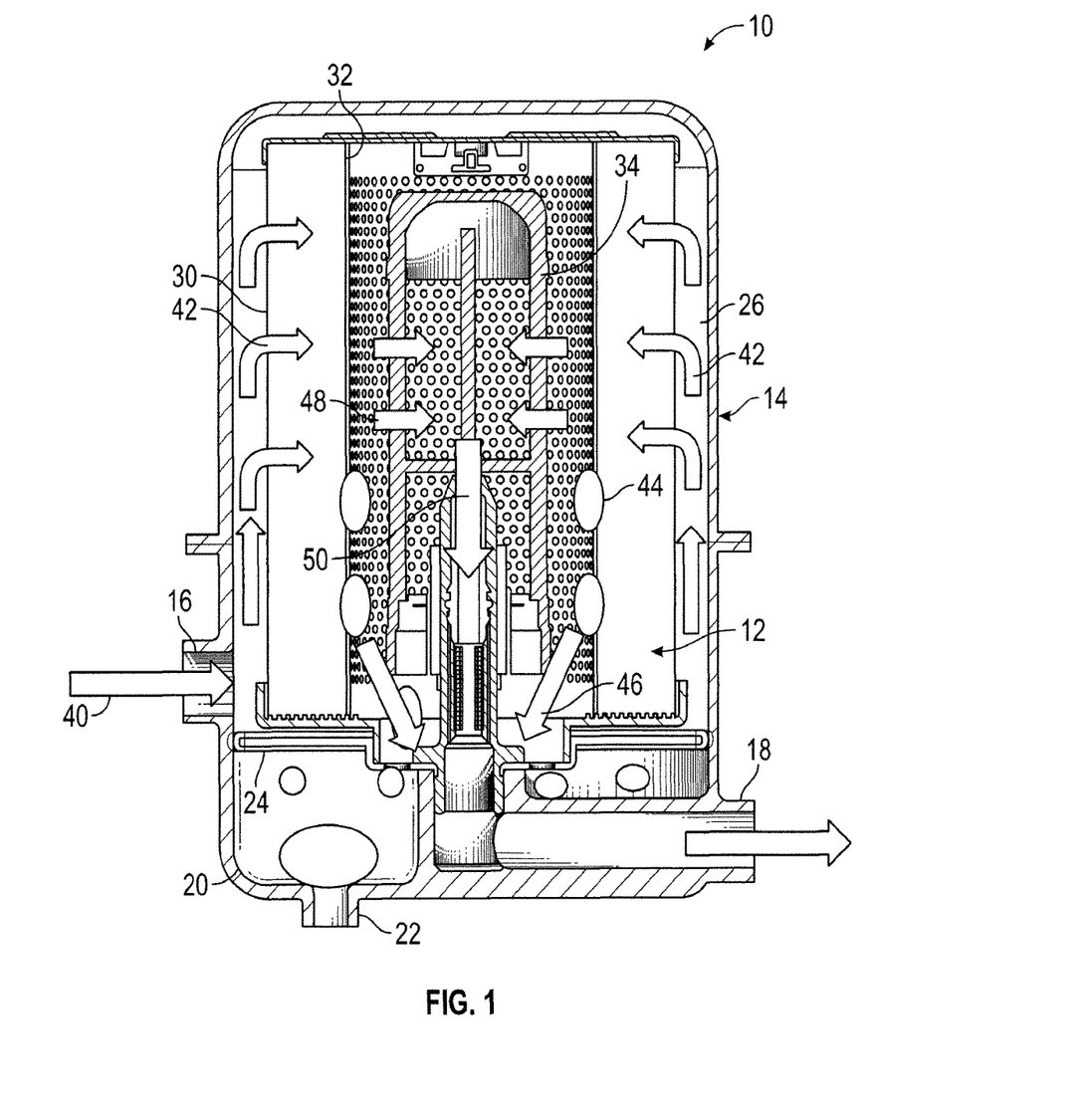
FIG. 1 is a cross-sectional side view of a filter assembly that includes a filter housing and a fuel water separator filter and illustrates the flow paths of water and fuel, according to some embodiments.
Figure 2:
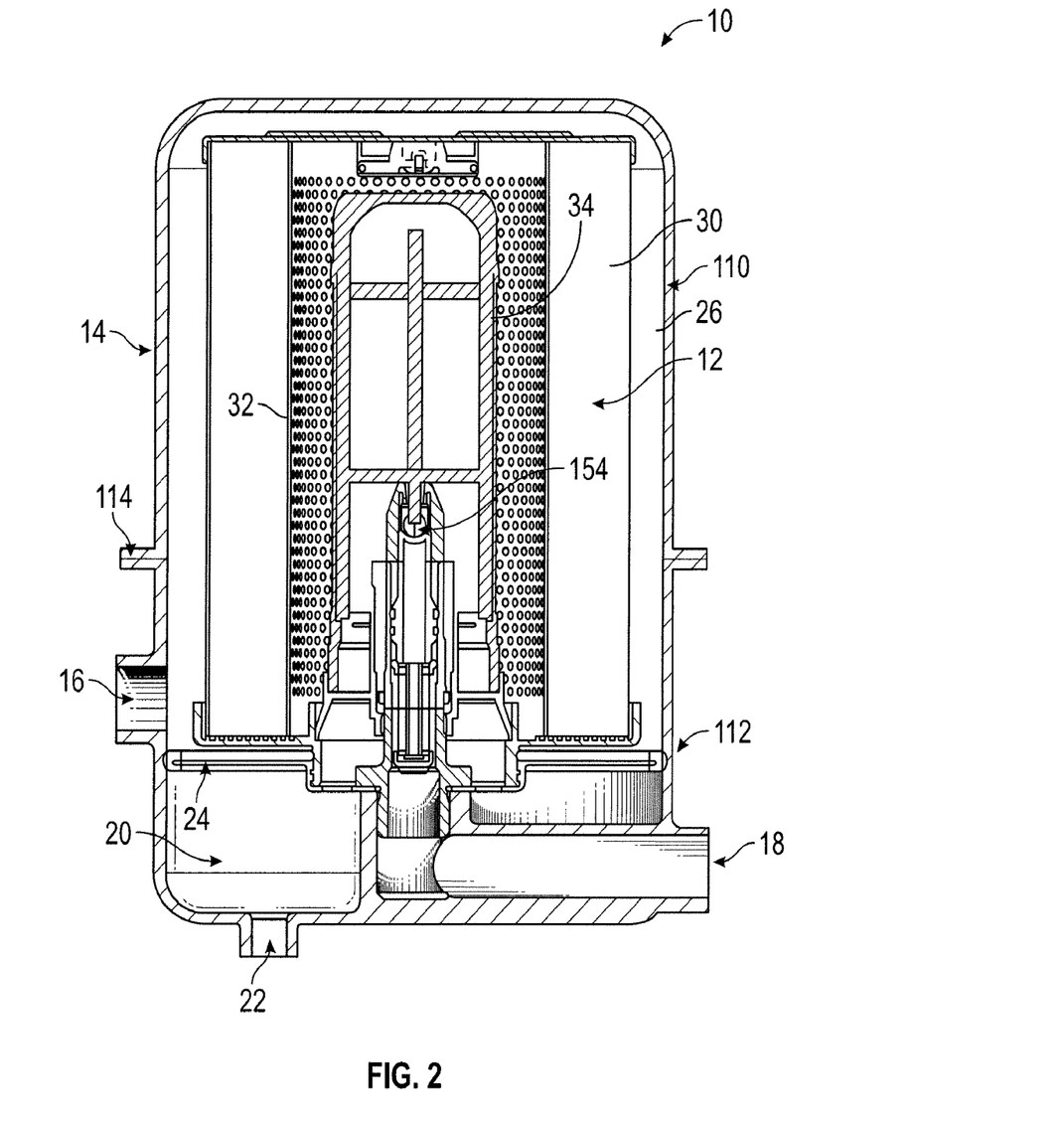
FIG. 2 is a cross-sectional side view of a filter assembly that includes a filter housing and a fuel water separator filter, according to some embodiments.

With reference now to FIGS. 1 and 2, a filter assembly 10 is illustrated that includes a fuel water separator filter 12 disposed within a filter housing 14. The housing 14 includes an inlet 16 through which fuel contaminated with water can enter, and an outlet 18 through which filtered fuel with water removed can flow downstream, such as to an engine. When used on the suction side, the outlet 18 is connected to a fuel pump (not shown) which pumps the fuel, such as to the engine.

The housing 14 defines an isolated water sump 20 at the base thereof that is configured to collect water that is separated from the fuel by the filter 12. A drain port 22 is provided that permits draining of water from the water sump 20. The isolated water sump 20 is formed by a wall 24 that is disposed within the housing 14, and that separates the interior space of the housing 14 into the water sump 20 and an upper filter chamber 26 that receives the filter 12.

The filter 12 is provided with at least 3 water separating layers. In the example shown in FIG. 1, three water separating layers are provided, with a first water separating layer formed by a filtration media 30, a second water separating layer formed by a coalescing layer 32, and a third water separating layer formed by a hydrophobic screen layer 34.

With reference to FIG. 1 and the arrows shown therein, the incoming fuel 40 enters the filter chamber 26 which is separated from the water sump 20. The incoming fuel flows into an area outside the filter 12 and the water sump 20, and then into the filtration media 30 as shown by the arrows 42. Water that is stripped from the fuel by the media 30 sinks to the base of the filter chamber 26 outside of the filter. The fuel passes through the media 30 and then to the coalescing layer 32 which coalesces water within the fuel to form large droplets 44 which sink to the base of the filter 12 and through suitable passageways in the wall 24 into the water sump 20 as shown by the arrows 46. The fuel then flows through the hydrophobic screen layer 34 as shown by the arrows 48 and any additional water droplets in the fuel are stripped out by the hydrophobic screen layer 34 and sink down into the water sump 20. The filtered fuel 50 then flows into a standpipe structure of the filter housing 14 which forms part of the outlet 18. The outer filter may seal against a wall of the water sump to prevent the bypass of unfiltered fuel and water.

The water that is stripped from the fuel by the media 30 can flow into the sump 20 during filter service. For example, during servicing, when the filter 12 is removed from the filter housing, the water separated by the media 30 can drain through the passageways in the wall 24 and into the water sump 20.

Returning to FIG. 2 together with FIGS. 3-5, details of the filter 12 will now be described. The filter 12 is configured as a filter-in-filter construction with an outer filter 60 (FIG. 4) and an inner filter 62 (FIG. 5). As illustrated in FIG. 2, the inner filter 62 is designed to fit within the outer filter 60 and connect thereto to secure the outer and inner filters 60, 62 to one another. In one embodiment, the filter-in-filter may be configured such that the outer and inner filters are configured in a concentric arrangement. The outer and inner filters may have any appropriate shape, such as a cylindrical shape.

Figure 4:
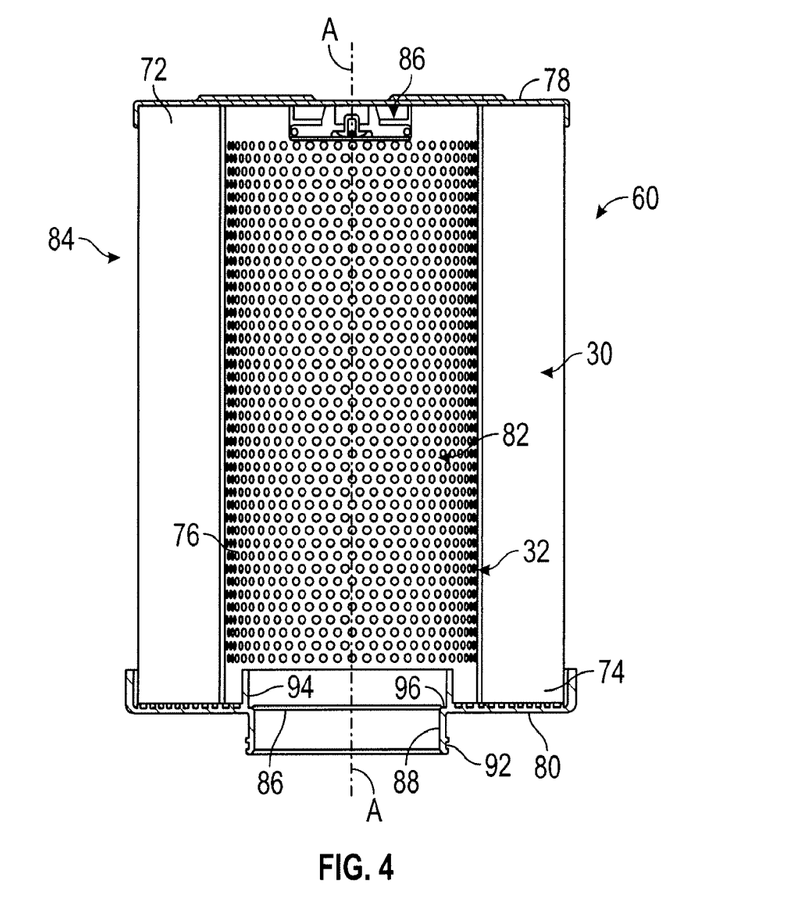
FIG. 4 is a cross-sectional side view of an outer filter of a fuel water separator filter, according to some embodiments.
Figure 5:
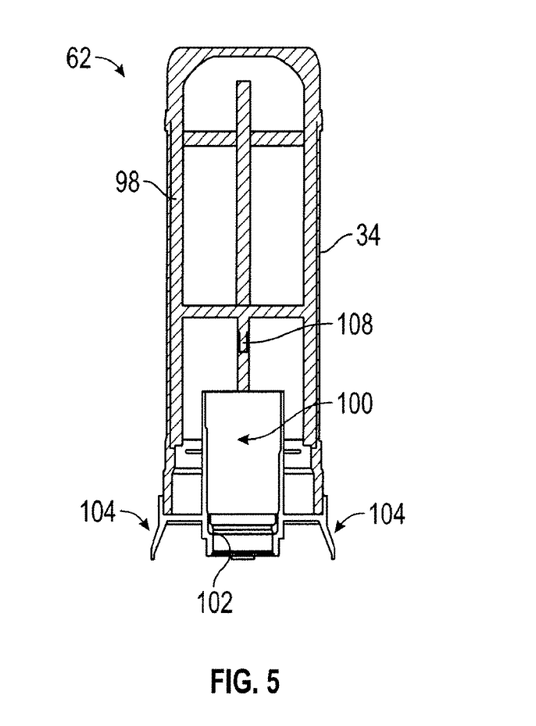
FIG. 5 is a cross-sectional side view of an inner filter of a fuel water separator filter, according to some embodiments.

Referring to FIG. 4, the outer filter 60 includes the filtration media 30 which can be any filtration media that is suitable for filtering the fuel by removing particulate contaminants. In one example, the media 30 can comprise pleated paper filtration media. The media 30 is arranged into a closed configuration or ring having a first end 72 and a second end 74 and circumscribing a central cavity 76 having a longitudinal axis A-A. The media 30 can have any suitable cross-sectional shape defining the central cavity 76, such as circular, triangular, oval, or the like.

An endplate 78 is sealingly attached to the first end 72 of the filtration media 30 to close the first end, and a second endplate 80 is sealingly attached to the second end 74 of the filtration media 30 to close the second end. The coalescing layer 32 is secured to the interior side of the media 30 and extends from the endplate 78 to the endplate 80. A centertube 82 that can be, for example, perforated to permit fuel flow therethrough is secured to the interior of the coalescing layer 32 and extends from the endplate 78 to the endplate 80 to help support the inner diameter of the media 30 and prevent it from collapsing. In addition, an optional half outer wrap 84, the construction of which is known, can be disposed around the outer circumference of the media 30.

The endplate 78 is generally constructed without fluid flow passageways so that no fuel can flow through the endplate 78. However, if deemed appropriate, an optional air vent 86 can be provided to allow venting of air from the interior of the filter 12.

The endplate 80 includes a central opening 86 formed therein, and a first neck 88 that extends downwardly from the endplate 80 surrounding the opening. The neck 88 is a circumferentially continuous structure that is configured to fit within and seal with a neck 90 formed in the wall 24 (see FIG. 6). The neck 88 and the neck 90 can have any suitable cross-sectional shape, for example circular or oval, configured to engage with one another as shown in FIGS. 1 and 2. Returning to FIG. 4, a sealing gasket recess 92 is formed on the outside of the neck 88 that receives a radially outward facing sealing gasket configured to seal with a radially inward facing surface of the neck 90 of the wall 24. The seal between the necks 88, 90 prevents fluid leakage therebetween, separating unfiltered fuel from filtered fuel and preventing unfiltered fuel from reaching the water sump 20.

The endplate 80 also includes a second neck 94 that extends upwardly from the endplate 80 into the central cavity 76 of the filter 60. The neck 94 is a circumferentially continuous structure that has a diameter slightly larger than the neck 88 to create a ledge 96. The ledge 96 engages a structure of the inner filter to support the inner filter within the outer filter.

As is apparent from FIG. 4, the endplate 80 of the filter 60 does not include a seal on the outer diameter of the endplate 80. Instead, the sealing gasket on the endplate 80 is disposed radially inward of the outer diameter thereof. In the example shown in FIG. 4, the sealing gasket is disposed radially inward of the filtration media 30, more particularly radially inward of the coalescing layer 32, and more particularly radially inward of the centertube 82.

Turning to FIG. 5, the inner filter 62 is designed to connect to the outer filter 60 through a snap-fit connection. The inner filter includes a generally hollow, cylindrical support frame 98 that supports the hydrophobic screen filter 34 on the outside thereof. The hydrophobic screen filter 34 generally has a cross-sectional shape that is circular, oval or another suitable shape, and is designed to further strip water from the fuel that flows into the central cavity 76 of the outer filter 60. The inner filter 62 further includes a guide sleeve 100 that may have, for example, a circular or an oval cross-section, and is configured to fit over a standpipe structure of the filter housing, as discussed further below. The inside of the sleeve 100 is provided with a sealing gasket 102 that is configured to seal with the outside surface of the standpipe structure to prevent leakage of filtered fuel to the water sump 20 and to force the filtered fuel to flow into and through the standpipe structure.

At the base of the support frame 98, circumferentially spaced snap-fit legs 104 are provided. The snap-fit legs 104 are configured to snap-fit engage with the ledge 96 on the outer filter to produce a snap-fit attachment of the inner filter to the outer filter. Further information on the use of snap-fit legs to connect an inner filter and an outer filter can be found in U.S. Pat. No. 7,857,974, which is incorporated herein by reference in its entirety.

Figure 3:
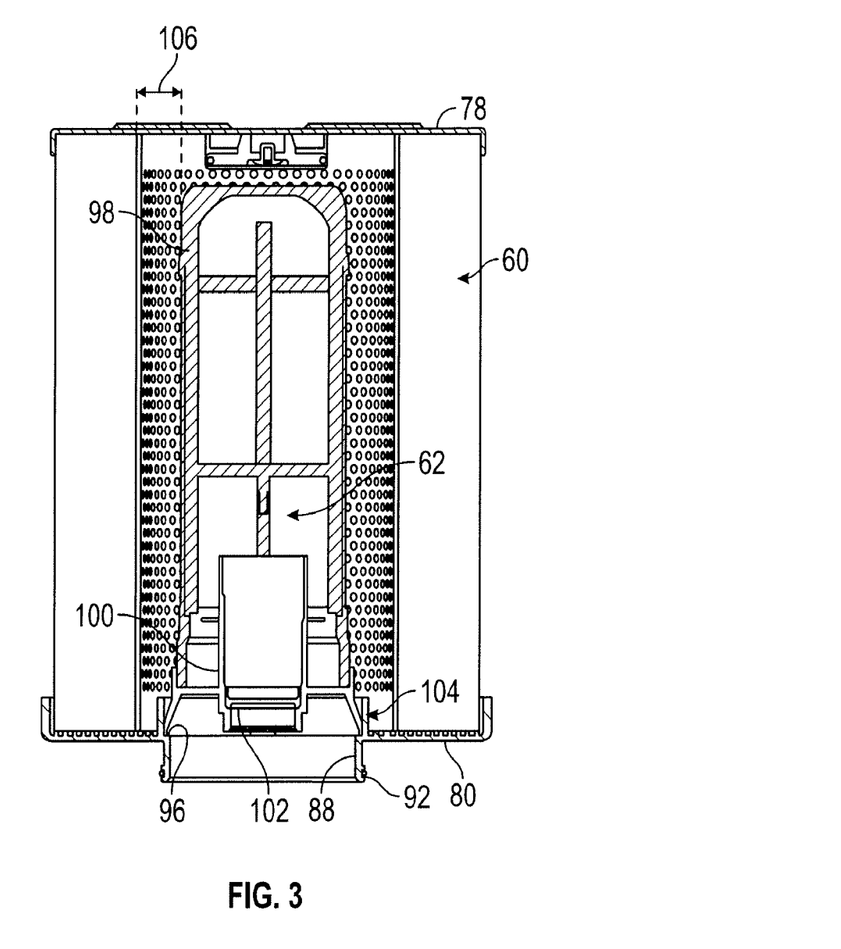
FIG. 3 is a cross-sectional side view of a fuel water separator filter, according to some embodiments.

As shown in FIG. 3, the hydrophobic screen filter 34 is spaced radially inward from the centertube 82 and the coalescing layer 32, producing a gap 106. The neck 88 is radially positioned so as to be disposed within the gap 106. The neck 88 and the sealing gasket thereof may be located between the sealing gasket 102 and the centertube 82, the coalescing layer 32, the filtration media, and/or the outer diameter of the endplate 80.

Returning to FIG. 5, in some embodiments, the filter 62 can be designed with a valve actuating protrusion 108, for example a pin, that projects downwardly toward the sleeve 100 from an interior support structure. The protrusion 108 may be part of a no filter, no run system that interacts with a valve (discussed further below) on the standpipe structure. When a correctly configured filter is not present, i.e. a filter having a suitably configured valve actuating protrusion, the valve in the standpipe structure prevents fuel flow through the standpipe structure and the outlet 18 in amounts sufficient to permit engine operation. An example of a no filter, no run system including a valve actuating protrusion and a valve in a standpipe is described in U.S. Pat. No. 7,857,974.

Figure 6:
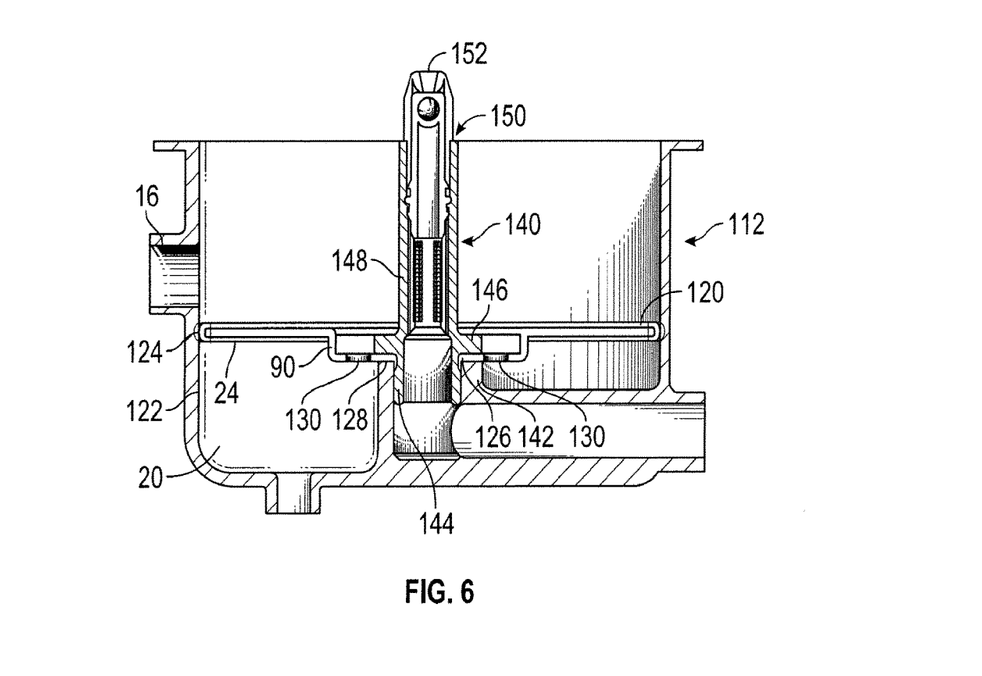
FIG. 6 is a cross-sectional side view of a lower housing of a filter housing of a fuel water separator filter assembly, according to some embodiments.

Referring now to FIGS. 1, 2 and 6, the filter housing 14 can include an upper housing 110 and a lower housing 112 that are detachably connected together and sealed to one another at an intersection 114. The upper housing and the lower housing can be detachably connected to one another using any suitable attachment mechanism, for example a clamp mechanism, bolts, or other mechanism known in the art. The lower housing 112 includes both the inlet 16 and the outlet 18.

As indicated above, the filter housing can be pre-formed with the isolated water sump 20, or an existing filter housing can be modified to create the isolated water sump 20. As shown in FIG. 6, the isolated water sump 20 is formed in the lower housing 112 by modifying an existing lower housing. In particular, the wall 24 is a structure that is installed within the lower housing 112 to create the water sump 20. The wall 24 is a generally plate-like structure with an outer perimeter edge 120 that generally matches the interior surface 122 of the lower housing beneath the fuel inlet 16. A sealing gasket 124 is disposed on the outer perimeter edge 120 to seal with the interior surface of the housing to prevent fuel leakage between the perimeter edge 120 and the housing.

The wall 24 also includes a central opening 126 the surrounding surface of which rests on an axially upwardly facing surface 128 of the outlet 18. The surface 128 is sealed with the wall 24 to prevent leakage of water into the outlet 18. As shown in FIG. 6, the neck 90 is formed between the central opening 126 and the perimeter edge 120. In addition, a plurality of holes or passageways 130 are formed through the plate 24 between the neck 90 and the central opening 126 to allow water to flow through the plate and into the water sump 20.

With continued reference to FIG. 6, optionally a standpipe structure 140 can be secured to a fuel outlet structure of the lower housing 112 to form a continuation of the outlet 18. The standpipe structure 140 is secured to an upwardly extending post 142 formed on the lower housing 112 and which provides the axially upwardly facing surface 128. The standpipe structure 140 includes a bottom end portion 144 that is secured to the post 142, for example by fitting into the post 142 and being secured to the post in any suitable manner, for example using threads, friction, adhesive, or thermal bonding. A flange 146 on the standpipe structure 140 helps to limit the extent of insertion of the bottom end portion 144 into the post 142, clamps the plate 24 between the flange and the surface 128 of the post 142, and helps to seal the plate 24 to prevent water leakage through the opening 126. Extending upwardly from the flange 146 is an upper portion 148 that extends upwardly into the inner filter 62 when the filter 12 is installed (as shown in FIGS. 1 and 2) and the outer surface of the upper portion 148 seals with the sealing gasket 102 on the sleeve 100 of the inner filter 62. In use, fuel that has been filtered by the filter 12 can enter the upper portion 148 of the standpipe structure 140 through one or more inlet passages formed in the upper portion 148, for example in the side or at the top end thereof, and then continue on through the outlet 18.

In one embodiment, the standpipe structure 140 can be provided with a valve mechanism 150 that forms part of a no filter, no run system. The valve mechanism 150 is designed to control flow into and/or through the standpipe structure 140 and the remainder of the outlet 18, with the valve mechanism 150 being located so as to be engaged by the valve actuating protrusion 108 when the filter is installed. When a filter with the correct valve actuating protrusion is installed, the valve mechanism permits fuel flow into and through the standpipe structure. When no filter is installed, or when an incorrect filter having no valve actuating protrusion or having an incorrect valve actuating protrusion is installed, the valve mechanism prevents all fuel flow through the standpipe structure or limits the fuel flow to an amount insufficient to permit engine operation.

Any valve mechanism 150 that is configured to achieve these functions can be utilized. In the illustrated example, the valve mechanism comprises a valve assembly that is installed into the top end of the upper portion 148. The valve assembly includes a top opening 152 through which the valve actuating protrusion 108 can extend, and a ball 154 (as shown in FIG. 2) that moves along a ball track. The position of the ball 154 along the ball track is controlled by the valve actuating protrusion 108, which in turn controls how much fuel can flow through the standpipe structure 140. Further information on the valve assembly, how the valve assembly can mount to the top end of the upper portion 148, and the operation of the ball for controlling fuel flow can be found in U.S. Pat. No. 8,020,708, the entire contents of which are incorporated herein by reference.

The terminology used herein is intended to describe particular embodiments and is not intended to be limiting. The terms "a," "an," and "the" include the plural forms as well, unless clearly indicated otherwise. The terms "comprises" and/or "comprising," when used herein, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used herein may, but does not necessarily, refer to the same embodiment. The embodiments described herein are exemplary only. Other and further embodiments may be devised without departing from the basic scope thereof, with the true scope and spirit of the disclosure being indicated by the claims that follow.

What is claimed:

1. A fuel water separator filter, comprising:
an outer filter with a bottom endplate;
an inner filter at least partially disposed within and secured to the outer filter;
the outer filter and the inner filter combined providing a plurality of water separating layers;
the inner filter including a first sealing gasket; and
the outer filter including a second sealing gasket that is disposed on a first neck of the outer filter, wherein the first neck is connected to the bottom endplate and is disposed radially inward of an outer diameter of the bottom endplate, the first neck of the outer filter configured to seal against a second neck and a first planar surface of an insert plate on a wall of a housing,
the insert plate separating the housing into a water sump and the fuel water separator filter, the insert plate including the first planar surface and a second planar surface, the second neck disposed between the first planar surface and the second planar surface, the first planar surface comprising at least one opening that allows water separated from the fuel to pass therethrough.

2. The fuel water separator filter of claim 1, wherein there is no sealing gasket on the outer diameter of the bottom endplate.

3. The fuel water separator filter of claim 1, wherein the outer filter includes a filtration media and a separate coalescing layer.

4. The fuel water separator filter of claim 1, wherein the inner filter comprises at least one of a pleated filter and a hydrophobic screen.

5. The fuel water separator filter of claim 1, wherein the water sump is isolated from a filter chamber of the housing.

6. The fuel water separator filter of claim 1, wherein the inner filter is secured to the outer filter by a snap-fit connection.

7. The fuel water separator filter of claim 1, wherein the outer filter further comprises a top endplate.

8. The fuel water separator filter of claim 1, wherein the outer filter further comprises a centertube.

9. The fuel water separator filter of claim 1, wherein the outer filter further comprises a second neck that extends into a central cavity of the outer filter, and the second neck forms a ledge configured to support the inner filter.

10. The fuel water separator filter of claim 1, wherein the inner filter comprises a support frame that includes a protrusion configured to activate a valve in a standpipe structure of a filter housing.

11. A filter housing, comprising:
a housing with a fuel inlet and a fuel outlet, the housing configured to house a fuel water separator filter; and
an insert plate provided in the housing that separates the housing into a water sump and a filter chamber, the insert plate including a first planar surface, a second planar surface, and a second neck, the second neck disposed between the first planar surface and the second planar surface, and the first planar surface comprises at least one opening, the water sump isolated by the insert plate from fuel entering the housing through the fuel inlet,
wherein the at least one opening allows water separated from the fuel to pass therethrough, and
wherein the second neck and the first planar surface of the insert plate is configured to seal against a first neck of the fuel water separator filter.

12. The filter housing of claim 11, wherein the insert plate is integrally formed with the filter housing.

13. The filter housing of claim 11, wherein the insert plate includes a center opening.

14. The filter housing of claim 11, further comprising a standpipe structure attached to the housing, the standpipe structure configured to fluidly communicate with the fuel outlet.

15. The filter housing of claim 14, wherein the standpipe structure includes a valve configured to be actuated by a protrusion of a fuel water separator filter.

16. A fuel water separator filter assembly for separating water from fuel, comprising:
a filter housing, the filter housing comprising:
a fuel inlet
a fuel outlet, the fuel outlet configured to be fluidly connected to a suction side of a fuel pump;
an insert plate provided in the housing that separates the housing into a water sump and a fuel water separator filter, the insert plate including a first planar surface, a second planar surface, and a second neck, the second neck disposed between the first planar surface and the second planar surface, and the first planar surface comprises at least one opening that allows water separated from the fuel to pass therethrough; and
the fuel water separator filter disposed within the filter housing, the fuel water separator filter including a plurality of water separating layers and comprising:
an outer filter with a bottom endplate;
an inner filter at least partially disposed within and secured to the outer filter, the inner filter including a first sealing gasket, wherein the outer filter and the inner filter combined providing a plurality of water separating layers; and
the outer filter including a second sealing gasket that is disposed on a first neck of the outer filter, wherein the first neck is connected to the bottom endplate and is disposed radially inward of an outer diameter of the bottom endplate, and wherein the first neck of the outer filter is configured to seal against the second neck and the first planar surface of the insert plate of the filter housing.

17. The fuel water separator filter assembly of claim 16, wherein the insert plate is configured such that water that is separated from the fuel at an outer layer of the fuel water separator filter sinks to a base of the housing.

18. The fuel water separator filter assembly of claim 16, wherein the insert plate is integrally formed with the filter housing.

19. The filter housing of claim 11, wherein the first planar surface includes a first portion and a second portion, the at least one opening disposed between the first portion and the second portion and wherein the second portion includes a central opening for fuel to pass through.

20. The fuel water separator filter assembly of claim 16, wherein the first planar surface includes a first portion and a second portion, the at least one opening disposed between the first portion and the second portion and wherein the second portion includes a central opening for fuel to pass through.

* * * * *